United States Patent [19]

Nettles

[11] 3,850,358

[45] Nov. 26, 1974

[54] CONTINUOUS COMPLIANT GUIDE FOR MOVING WEB

[75] Inventor: Michael L. Nettles, Boulder, Colo.

[73] Assignee: International Business Machines Corporation, Armonk, N.Y.

[22] Filed: Feb. 26, 1973

[21] Appl. No.: 335,609

Related U.S. Application Data

[63] Continuation-in-part of Ser. No. 210,034, Dec. 20, 1971, abandoned.

[52] U.S. Cl. ................................ 226/198, 226/199
[51] Int. Cl. ............................................ B65h 23/32
[58] Field of Search ............ 226/97, 196, 198, 197, 226/199; 242/157

[56] References Cited

UNITED STATES PATENTS

| | | | |
|---|---|---|---|
| 3,281,040 | 10/1966 | Grant | 226/97 |
| 3,371,835 | 3/1968 | Pendleton | 226/198 X |
| 3,501,078 | 3/1970 | Chang | 226/198 |
| 3,661,311 | 3/1969 | Warren | 226/198 |

*Primary Examiner*—M. Henson Wood, Jr.
*Assistant Examiner*—Gene A. Church
*Attorney, Agent, or Firm*—Homer L. Knearl

[57] ABSTRACT

Magnetic tape is guided to and from a read/write station with long continuous compliant guides. The objectives of the guides are to (1) eliminate at the read/-write station perturbations in movement of the tape caused by the tape sink or tape source outside the guided length, (2) remove skew or lateral displacement of the tape due to cyclic perturbations in edge profile of the tape, and (3) distribute tension equally across the width of the tape at the read/write station even though there is unequal tension in the tape at the tape source or tape sink. All of these objectives are accomplished by continuously compliantly guiding the tape through a curved path with uniformly distributed edge force both before and after the read/write station. The uniformly distributed edge force is typically provided by a series of high compliant spring-loaded fingers distributed continuously along the guided length or by a continuous compliant strip mounted along the guided length. The continuously distributed guiding may be applied to both edges of the tape or only to one edge of the tape. The guide path may assume any curved or twisted path, and many paths are shown herein. In addition, to enhance the guiding control, the tape source and tape sink may be decoupled from the guide by providing a vacuum column either at the source or at both the source and the sink.

23 Claims, 10 Drawing Figures

CONTINUOUS COMPLIANT GUIDE FOR MOVING WEB

CROSS-REFERENCE TO RELATED APPLICATION

This patent is a continuation-in-part of commonly assigned, copending and now abandoned application Ser. No. 210,034, filed Dec. 20, 1971, by Michael L. Nettles.

BACKGROUND OF THE INVENTION

1. Field of the Invention

This invention relates to guiding of a web with extreme accuracy. More particularly, the invention relates to guiding magnetic tape repeatedly along the same line with an accuracy in the order of 10's of microinches in an environment where perturbations in the order of 10's of mils occur in position of the tape source or tape sink at each end of the guided length. Repeatedly guiding within microinches at the read/write station permits reading and writing of high areal density recordings on the tape.

2. History of the Art

Continuous guiding of a web over a curved path dates back to at least the 1930's. It was recognized at that time that movie film could be more accurately guided to and from a projection station by curving the film with guides to provide rigidity in the film and then loading the film sideways with one large spring-loaded guide. The spring-loaded guide was a single rigid guide rather than a compliant guide. It held the film rigidly against a fixed guide.

Some years later, in the magnetic tape recording technology, it was recognized that there were cyclic perturbations in the edge profile of the magnetic tape. These perturbations are due to the slight misalignment of slitting discs that slit large webs of magnetic tape into the desired width dimension. Magnetic tape guiding to counteract these cyclic width variations consisted of guiding the tape over a long guide where the length of the guide was greater than the cycle of the width variations. In other words, the guide was longer than the distance between two maximums in the edge profile of the tape. These maximums or high points of edge profile of the tape were butted against a rigid guide by mechanically forcing the tape against that edge with idler rollers or with air bearings. These systems did tend to eliminate problems of skew but did nothing to correct for tape source or sink perturbations that could disturb the position of the tape at the read/write station.

Isolated spring-loaded guides were also developed in the magnetic tape recording technology. Typically, these guides consisted of one or two idler rollers or air bearings positioned near the read/write station and having one rigid flange that was spring-loaded to push the tape against the other fixed flange of the guide. These isolated or discrete guides are inadequate for high accuracy guiding at the read/write station because the net guiding force must be kept low to avoid buckling the tape. Discrete spring-loaded edge guides with their rigid faces tend to buckle the tape because of the stress concentration they produce in the tape. Further, because these guides are short, they do not have the capability of evenly distributing tension across the tape before the tape reaches the read/write station.

It is the object of this invention to guide webs with high accuracy past a central work station or critical area of web control by substantially eliminating perturbations in the lateral movement of the tape due to cyclic width perturbations in the tape, perturbations in the web source and sink outside the guided length, and finally, perturbations in web tension outside the guided length.

SUMMARY OF THE INVENTION

In accordance with this invention, the above object has been accomplished by continuously compliantly guiding a web over an arcuate path past the critical area of web control. In the environment of magnetic recording, the invention compliantly, continuously guides a magnetic tape over an arcuate path both before and after a read/write transducer. The compliant guides are typically springs positioned adjacent each other continuously along the guided length or a compliant strip along the guided length. Spring guides constitute an edge force. An example of another edge force might be a piston or an elastic bag pneumatically biased to engage the edge of the web. The significance of the continuous compliant guide is that the forces are uniformly distributed along the entire guided length.

Further, the compliant guides may be mounted at both edges of the web. Alternatively, one edge of the web may be guided by a fixed guide while the other edge is compliantly guided. If both edges are compliantly guided, the guide position is a nominal no-lateral-movement position of the guided web. In the alternative, if only one edge of the web is compliantly guided and the other edge abuts a fixed guide, the lateral reference for the web is the fixed guide.

As a further feature of the invention, an air bearing is provided all along the entire guided length. The air bearing aids in the movement of the web and also aids in the holding of the web in an arcuate path.

As a further feature of the invention, the guided length of the web both before and after the work station is at least $\lambda$ where $\lambda$ is the wavelength of edge profile variations in the web.

Yet as a further feature of the invention, the guided length is at least twice the width of the web and exists on both sides of the work station whereby any perturbations in tension caused by variations in the web source or web sink will be distributed uniformly across the web by the time the web reaches the work station.

As a further feature of the invention, the guide requirements of the guided length may be relaxed by decoupling perturbations between the tape source or tape sink and the guided length. The decoupling may be accomplished as, for example, by use of vacuum columns.

The great advantage of my invention is that the continuous compliant guides guide a web to a work station and position it there accurately while displacements at the web source or sink outside the guided length are relatively large. Further, depending upon the accuracy of guidance required, tradeoffs may be made in the continuous compliant guide to achieve guiding required. For example, vacuum columns may not be required, and a slightly longer guided length may be used in their stead. On the other hand, vacuum columns may be very desirable, and shorter guided length provided. In other words, if the perturbations in movement of a web at the web source or sink are decoupled from the guided length, the amount of guided length required on both sides of the read/write station varies. Thus, the guided length provides an economical way of removing perturbations in web movement at the source or sink from perturbations in the web movement at the work station. The degree of decoupling and thus the degree of guidance required by the invention depends upon the accuracy required and the size of perturbations at the tape source or sink.

Yet another advantage of my invention is that the guiding force is independent of the width or edge profile variations in the tape. In other words, along the guided length, the guiding force is the same whether the guide is pushing on a valley or a peak in the edge profile of the tape.

The foregoing and other objects, features and advantages of the invention will be apparent from the following more particular description of preferred embodiments of the invention as illustrated in the accompanying drawings.

FACTORS IN DESIGN OF COMPLIANT GUIDE

Figure 1:
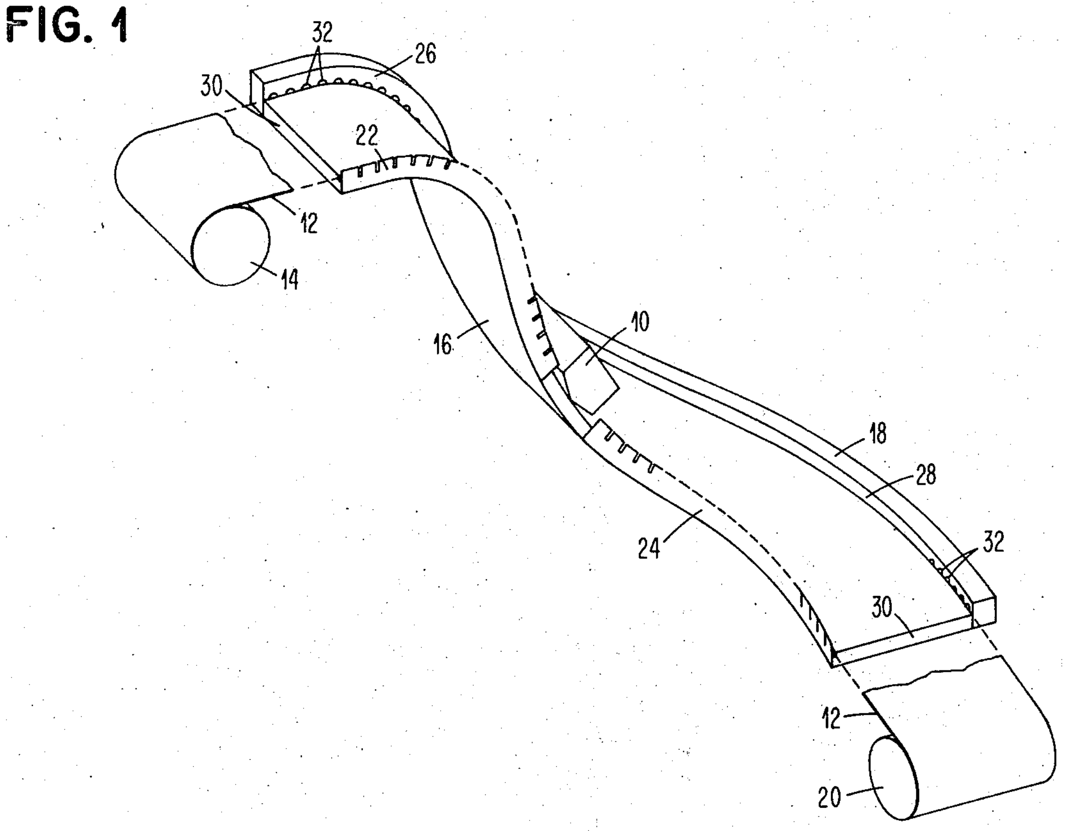
FIG. 1 shows a preferred embodiment of the invention in the most general sense where the arcuate path of the web varies in all three dimensions.

The objective of guiding magnetic tape is to position an imaginary reference line on the tape repeatedly over the same point on a read/write transducer with no errors in azimuth angle of approach, lateral position or fly height. Dynamic forces on the tape produce dynamic displacements of the tape and thus the positioning error of the tape at the read/write transducer. Therefore, the guide must minimize the effect that these forces have on the tape section that is located adjacent the read/write transducer.

The design philosophy in minimizing these effects contains four aspects—(1) a long guided length, (2) continuously uniformly distributed edge guide forces, (3) arcuate tape path over the guided length, and (4) decoupling of the guided length from the tape transport dynamics which supply and take up the tape.

LONG GUIDED LENGTH

Tape guides and the total guided length of the tape path before and after a read/write station should be long compared to the width of the tape. The lateral stiffness of the tape in a guide is inversely proportional to the cube of the length of the guide. Guide forces applied to the edge of the tape over a long guided length are highly effective in isolating the read/write area from lateral motions originating in other areas of the tape path. Therefore, a perturbation, which would result in a tape guiding error, is more easily overcome as the guided length increases.

Tape geometric parameters, such as width, thickness, the deviation of the edges from straight parallel lines, etc., are also important in the choice of the guiding technique. The most relevant geometric parameters of the tape appear to be the width of the tape and the wavelength of the tape edge runout. Edge runout of the tape refers to the cyclic edge profile variations in the tape caused by the slitting operation when the tape is manufactured.

With regard to the width of the tape, small non-uniform longitudinal (directed along the length of tape) stress levels in magnetic tape tend to redistribute themselves uniformly across the width of the tape after a length which varies from approximately two to four times the tape width. In other words, a non-uniform longitudinal stress at one end of unguided tape will be evenly distributed across the tape if the tape is compliantly guided for a length of from two to four times the width of the tape. Thus, as a conservative approach, the guided length before and after a critical area of web control should be approximately four times the width of the tape or approximately a total of eight times the width of the tape for the overall guided length.

With regard to runout, the guided length on each side of the read/write transducer is preferably longer than the wavelength of the runout. Thus, overall, including guiding both before and after the read/write transducer the guided length is approximately two times the wavelength of the runout. This represents the most conservative approach and, depending upon accuracies required, the guided length may be shorter.

ARCUATE PATH

The tape path should be continuously curved in the long guided length discussed above because the curvature in the tape gives the tape buckling stiffness. The choice of the particular curve depends upon the application and stiffness desired. The buckling stiffness of the tape varies inversely with its longitudinal radius of curvature. For each combination of radius of curvature and tape thickness, there exists a critical edge loading force called the critical buckling force. Edge guiding forces above the critical buckling force will transversely collapse the tape resulting in loss of guiding control and increased wear.

CONTINUOUS COMPLIANT GUIDING

The edge guiding force should be continuously and uniformly applied over the long guided length discussed above. This permits the maximum effective guiding force without stress concentration. The continuous guide should be compliant in two dimensions—transversely across the width of the tape and pivotally along the edge profile of the tape.

The pivotal compliance is most easily accomplished in a continuous strip guide by making the thickness of the strip much smaller than the length of the tape runout. For example, the tape runout is typically on the order of 10 inches while the thickness of the edge guiding strips shown is on the order of a few mils.

Where the continuous guide is approximated by a series of discrete guides positioned adjacent each other, each discrete guide should be made of strip material, again much smaller in dimension than the length of the tape runout. The key is that each section of the continuous guide should be able to pivot about an axis normal to the surface of the tape so that the guide will follow the contour of the edge profile of the tape.

Transverse compliance of the edge guide means essentially that the spring constant of the edge guide should approach zero in the ideal case. In other words, irrespective of the deflection of the edge guide, it provides the same identical force to the edge of the tape. In a typical guide application using spring guides discussed hereinafter, the spring constant is approximately 0.25 gram per mil of deflection per linear inch of guided length. While a tape is being guided, the nominal spring force is approximately 5 gms/in of guided length. The edge runout varies approximately 3 to 4 mils; accordingly, an edge guiding force of approximately 5 gms/in varies by 0.75 gms/in.

A spring constant approaching zero can more ideally be achieved by use of an elastic bag or diaphragm discussed hereinafter. However, even in this case the spring constant is finite due to the elasticity of the bag or diaphragm.

Figure 8:
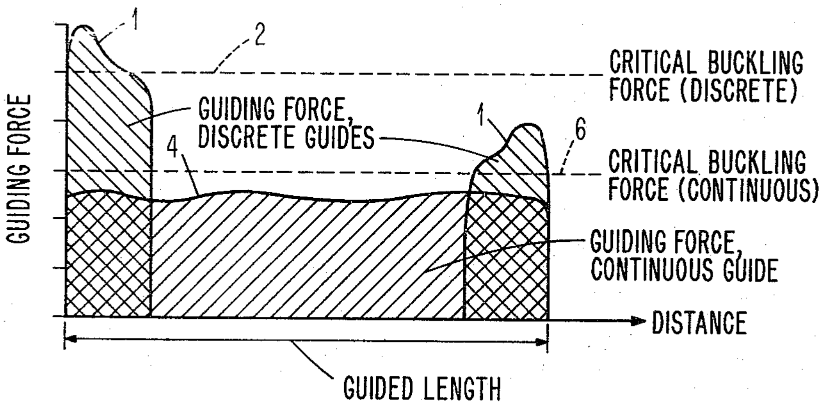
FIG. 8 is a graph comparing guide forces for discrete edge guides with guide forces for a continuous compliant guide.

In FIG. 8 (last sheet of drawing) the advantage and superiority of continuous, uniformly distributed force guiding over discrete force guiding is diagrammed in a graph. For a given guided length, to achieve the same guiding requires different guiding forces for the discrete and continuous cases. The guiding force 1 for discrete guides is represented by the two spikes. Assuming the amplitude of the spikes represents the amount of force required to guide the tape, the radius of the curvature of the guide must be short so that the critical buckling force 2 will be higher than the guide force. Because discrete guides often are not square relative to the edge of the tape, the top of their force diagram, instead of being flat, tends to be sharp. Accordingly, many times these guides exceed the critical buckling force 2 and lose effective guiding control.

On the other hand, the continuous uniformly distributed guide accomplishes the same guiding control with a much lower guiding force uniformly distributed along the entire guided length. This uniformly distributed guiding force 4 can be achieved using a longer radius of curvature for the guide, and accordingly a much lower critical buckling force 6. In addition, because of the uniformity and compliance of the continuous guide, the guiding force 4 can be designed as close as 90 percent of the critical buckling force without the danger of exceeding the buckling force at any discrete position along the guided length. The danger of exceeding critical buckling force is reduced because compliance of the continuous guide eliminates misalignment between tape edge and guide face and therefore avoids stress concentration i the in Accordingly, the continuous compliant guide provides better control with less force and therefore less wear.

If compliant guides are applied to both edges of the tape, this effectively means that the tape is held at a nominal position despite any waviness or snakiness due to its own width variations or dynamic forces acting on it.

If the compliant guide is only applied to one edge of the tape and the opposite edge is guided with a rigid guide, the effect of the compliant guides is to push the tape against the rigid guide so that all along the entire length of the tape the tape abuts the rigid guide. In other words, due to the elasticity of the tape, the compliant guides will force each section of the tape laterally sideways until it contacts the rigid guide. This has the effect of reducing edge runout on the rigid guided side to zero amplitude while increasing amplitude of runout on the compliant guided side to approximately twice the normal amplitude. In this manner, the tape will be referenced laterally to the rigid guide, irrespective of width variations in the tape or other dynamic forces on the tape.

Decoupling of the Guided Length from Other Tape Drive Dynamics

The amount of guiding required by the long guided length can be reduced by decoupling the guided length from dynamic tape drive forces that cannot be held to tight tolerances. For example, if decoupling is desired, a vacuum column might be placed between a tape reel and the guided length decoupling the dynamics of the tape reel from the guided length. This decoupling might be applied to both ends of the guided length as the guide requirements dictate.

With the above design factors in mind, a detailed description of the preferred embodiments follows with references to the attached drawings.

DESCRIPTION OF PREFERRED EMBODIMENTS

In FIG. 1, the guided length is shown with a variety of radii in the arcuate paths before and after the read/-write transducer 10. Tape 12 supplied from tape source 14 moves along guide section 16 before reaching the transducer 10 and, subsequently, along guide section 18 to a tape sink 20. The tape 12 is shown broken both from the source 14 to guide section 16 and from guide section 18 to sink 20 so as to schematically indicate that decoupling may be inserted at these break points. The decoupling effectively decouples the dynamic forces of the tape source 14 from guide section 16 or, likewise, from tape sink 20 to guide section 18. Examples of decoupling will be shown hereinafter.

Guidance in the guide sections is provided by continuous compliant guides 22 and 24. These guides are simply a thin metal strip which has been slit so that a series of metal fingers or springs bear lightly against the edge of the tape 12 to urge the tape against the rigid guides 26 and 28. The bottom 30 of the guided lengths 16 and 18 is made of a porous material so that air under pressure may be forced through it to provide an air bearing on which the tape rides. The air bearing supports the tape with forces normal to the surface of the tape. In addition, the air bearing provides a low drag force as the tape is moved along the guided length. Both the fixed guides 26 and 28 contain indentations 32 which permit the air under the tape to bleed off around the edge of the tape abutting the rigid guides 26 and 28.

Figure 2A:
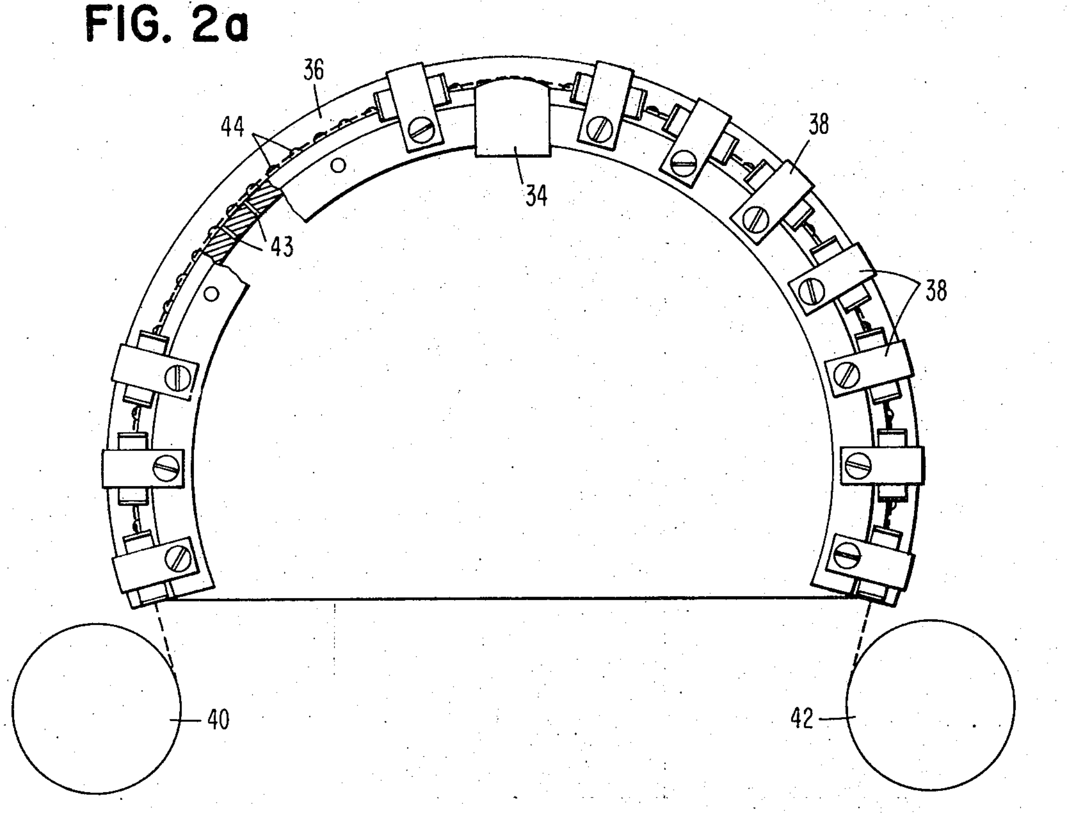
FIG. 2*a* shows another preferred embodiment of the invention where the arcuate path is a circle with the transducer mounted at the top of the circle, and the tape is moved solely by a reel-to-reel drive.
Figure 2B:
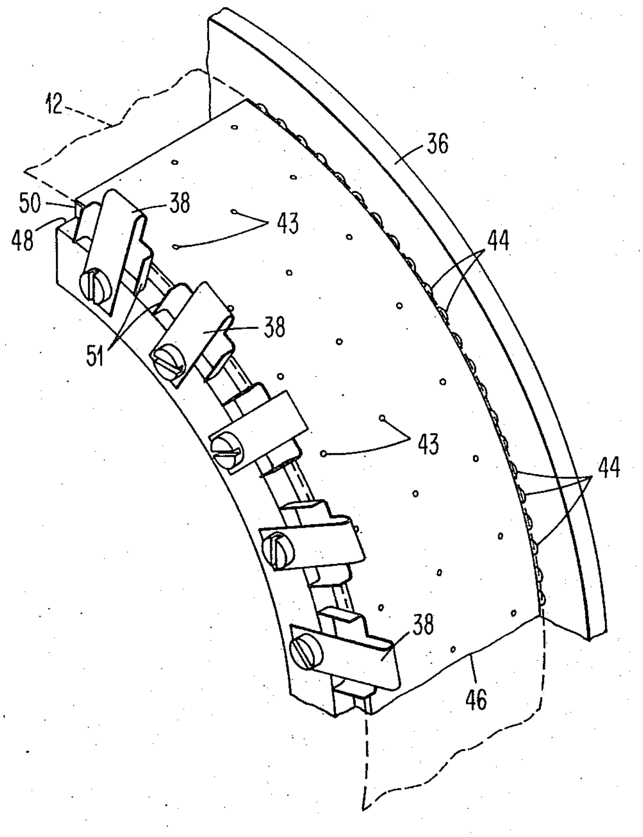
FIG. 2*b* is a detailed view of a section of the guide in FIG. 2*a*.

FIGS. 2*a* and 2*b* show a more specific example of a preferred embodiment. Again, the guided length extends both before and after a transducer 34. A rigid guide 36 is provided on one edge of the tape, and compliant spring guides 38 are provided for the other edge of the tape. Tape reels 40 and 42 provide the drive for moving the tape past the transducer 34.

The air bearing upon which the tape rides is provided by a series of holes 43 through the bottom plate of the guide. Air under pressure is forced through these holes, creates the air bearing for the tape, and exits out the edge of the tape either between the compliant springs 38 or via the ports 44 in the rigid guide 36.

A perspective view of the section of a guided length in the embodiment of FIG. 2*a* is shown in FIG. 2*b*. Identical elements in FIGS. 2*a* and 2*b* have been given the same reference numerals. As tape 12 moves along the guided length, it is pressed against rigid guide 36 by the continuous compliant guide made up of adjacent springs 38. The air bearing is provided by air through ports 43 passing through the bottom 46 of the guide. Air under the tape exits either between the springs 38 or out the ports 44.

The bottom of the guide 46 has a notch 48 at the edge where the compliant guides are mounted. When there is no tape in the guide, each of the springs 38 rests against the inner wall 50 of the notch. As soon as a tape is present in the guided length, the springs are loaded and provide a force to keep the opposite edge of the tape in contact along its entire length with the rigid guide 36. Note that the faces of springs 38 have rounded edges 51 so that the tape will not catch on a spring.

Figure 3:
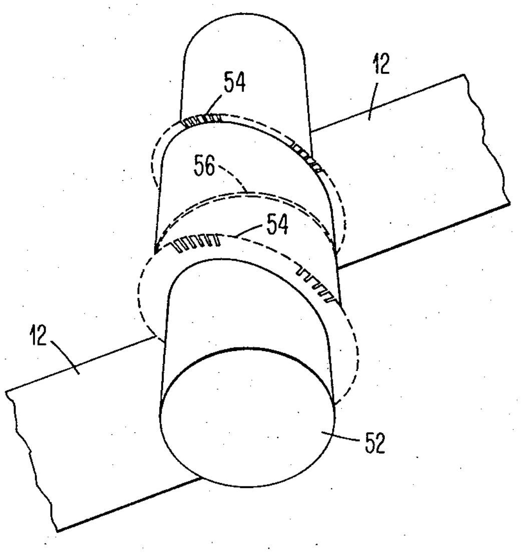
FIG. 3 shows a continuous compliant guide wrapped as a helix about an air bearing with compliant guides at both edges of the tape, and the transducer rotating inside the helix.

In FIG. 3, another specific example of continuous compliant guiding is shown wherein tape 12 is wrapped about a mandrel 52. Inside the mandrel is a rotating head which performs a transverse scan of the tape in the well known manner. The tape 12 is compliantly guided in the helical path around the mandrel 52 by continuous compliant guides at both edges of the tape. As shown in FIG. 3, the continuous compliant guide is a metal strip 54 with vertical fingers just as in FIG. 1. The path of the rotating head is represented by the dashed lines 56.

FIG. 3 is of interest both from the standpoint that it shows continuous compliant guiding at both edges of the tape rather than at one edge and, also, in that it shows use of the invention in the environment of a rotating head.

Figure 4A:
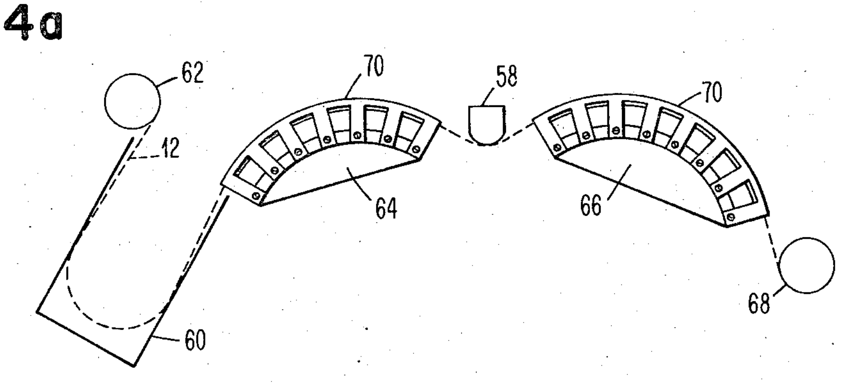
FIG. 4*a* shows another preferred embodiment of the invention with compliant guides of slightly different configuration and with decoupling of the tape source to the guides by means of a vacuum column.
Figure 4B:
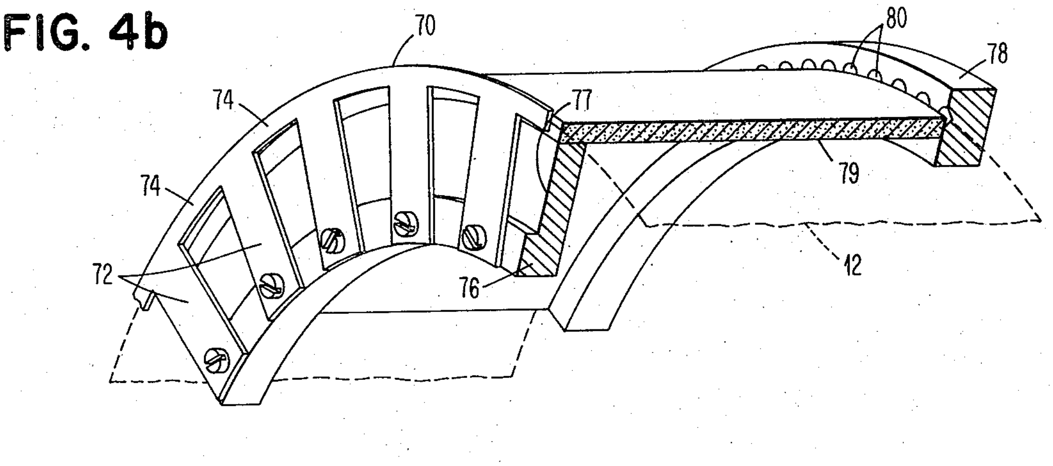
FIG. 4*b* is a detailed view of a section of the guide in FIG. 4*a*.

Another preferred embodiment of the invention is shown in FIG. 4*a*. A detail section of the same guide is shown in FIG. 4*b*. The tape 12, in this case, is guided past the transducer 58 by continuous compliant edge guide along one edge and a fixed edge guide position along the opposite edge. In addition, a vacuum column 60 decouples the guided length 64 from dynamic forces created at the tape source 62.

The tape is continuously compliantly guided by guide 64 to the transducer 58 and thereafter by continuous compliant guide 66 to a tape sink 68. Tape sink 68 may be looked upon as a capstan or a takeup reel. The requirements on the tape guide 66 depend upon the quality of the tape sink 68.

A detailed section of one portion of the tape guided length in FIG. 4*a* is shown in FIG. 4*b*. Identical elements in FIGS. 4*a* and 4*b* have been given the same reference numerals. The continuous compliant spring 70 is made of a single piece for each guided length. The main guiding force is provided by the wide, thin, vertical segments 72. The narrow, thin necks 74 connecting the vertical segments 72 provide additional bearing surface for the tape to ride upon and more nearly approximate the ideal of a continuous compliant guide. The continuous guide has a very low spring constant, $K =$ 0.25 gm per mil of deflection per inch of guided length, to give the guide compliance in the direction across the width of the tape. Thickness of the guide is a few mils to give the guide pivotal compliance to conform to edge profile of the tape.

The continuous compliant spring 70 is mounted on plate 76 of the guide at a very slight angle so that it provides some spring load against the wall 77 of the guided length even when the tape 12 is not present. When the tape is present between the edge guides, the continuous compliant spring 70 is bent backwards and provides force against the tape to urge the entire length of the tape against the opposite rigid guide 78.

The support member 79 in FIG. 4*b* is constructed of a porous material so that air under pressure through the porous material will provide an air bearing to the tape 12. The air under the tape 12 may exit out the edges of the tape either between the fingers 72 of compliant spring 70 or through the holes 80 in the rigid guide 78.

Figure 5:
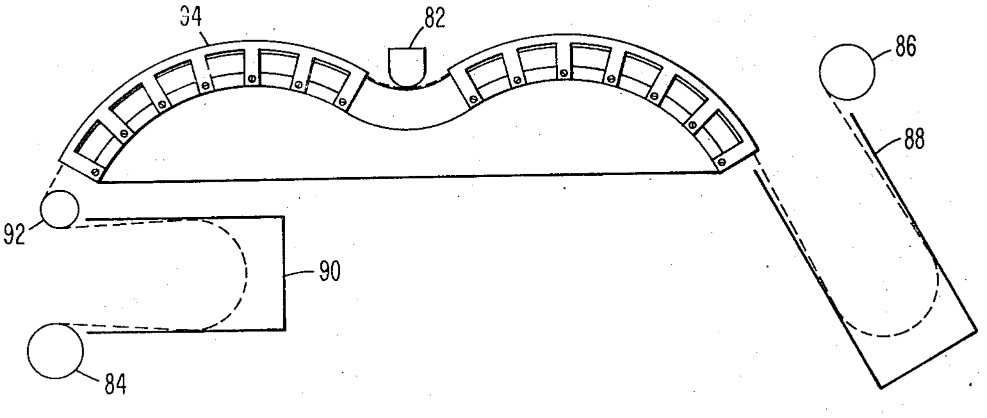
FIG. 5 is similar to FIG. 4 except that both the source and sink are decoupled via vacuum columns and the tape is moved by a capstan.

FIG. 5 shows a continuous compliant guide on each side of a transducer 82 wherein tape is supplied from reel 84 and taken up by reel 86. Dynamic forces due to the takeup reel 86 are decoupled from the guided length by the vacuum column 88. Dynamic forces in the supply reel 84 are decoupled from the guided length by the vacuum column 90. To provide very positive drive to the tape, a capstan 92 is positioned between the vacuum column 90 and the first guided length 94. The dynamic forces which the capstan 92 may place on the tape will be handled by the guided length 94.

The continuous compliant guides in FIG. 5 are the same type as in FIGS. 4*a* and 4*b*. The back edge (not shown) of the tape might be guided by a rigid guide or by a continuous compliant guide.

While spring guides are easy to manufacture and low in cost, they are not the only types of continuous compliant guides that might be used to perform my invention.

Another continuous guide that has excellent compliant characteristics is a thin guide strip bonded to the surface of an elastic bag or elastic diaphragm. The bag or diaphragm may then be loaded with a uniform and completely compliant force by providing a pneumatic pressure source to the back of the bag or diaphragm wall. The pneumatic pressure source will provide the same force against the strip irrespective of the lateral displacement of the strip, and thus the continuous guide will have a spring constant that approaches zero.

Figures 6, 7:
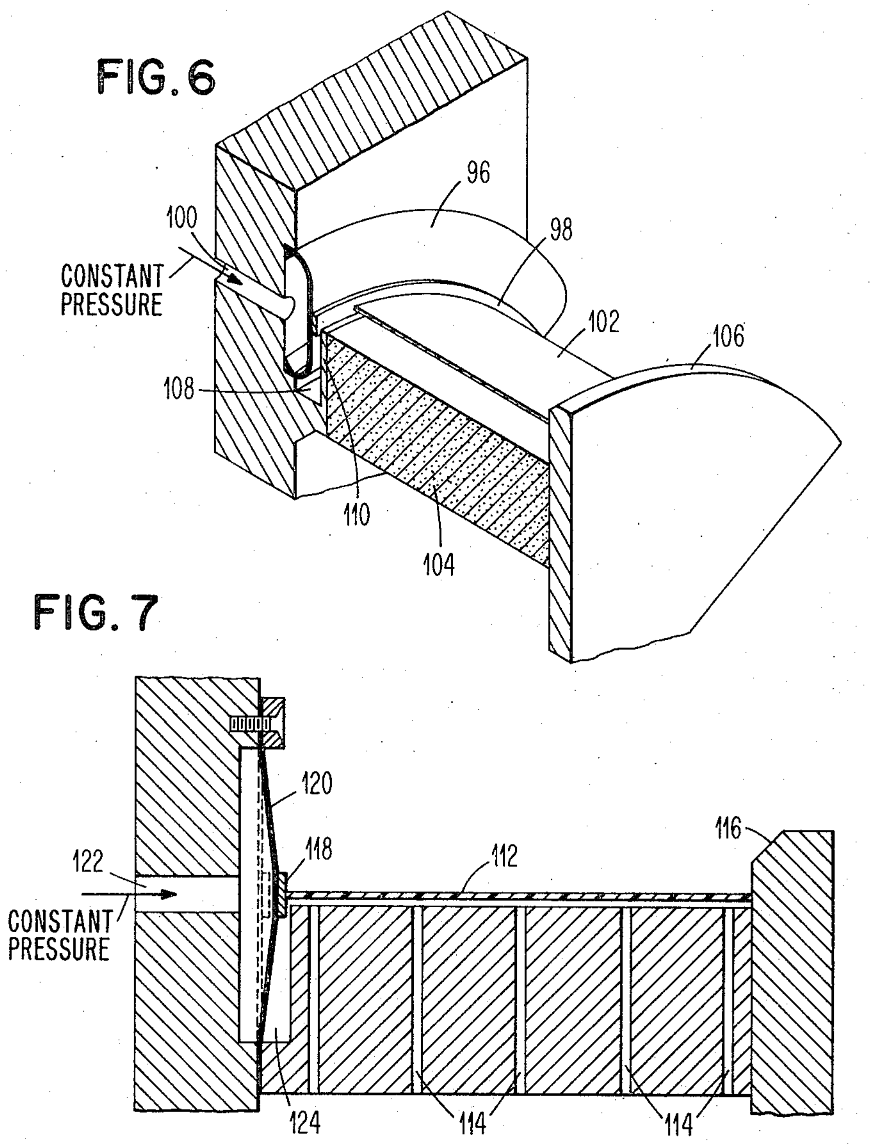
FIG. 6 shows another preferred embodiment of the invention where the continuous compliant guide is an elastic bag having a guide strip bonded on its surface.
FIG. 7 shows in cross-section another preferred embodiment of the invention similar to FIG. 6 except that a diaphragm replaces the elastic bag.

In FIG. 6 a continuous guide using an elastic bag is shown. Bag 96 has bonded to its surface the guide strip 98. To provide pivotal compliance, the guide strip 98 is only a few mils thick. Pneumatic pressure to the back wall of the bag 96 is provided through the port 100. Tape 102 is supported by an air bearing due to air passed through porous base 104. Air under pressure below base 104 forces air through the porous base forming the air bearing. The guide strip 98 provides the edge force to guide tape 102 against the rigid guide 106.

Air supporting the tape 102 from the porous base 104 can escape out the edges of the tape via ports in the rigid guide 106 (not shown but similar to ports 44 in FIG. 2b). In addition, the air can also escape out the channel 108 under the guide strip 98 at the compliant guide edge. Since guide 98 contacts the edge of the tape, it is held away from contacting wall 110 and thus air from the air bearing under the tape 102 can escape down into the channel 108.

In FIG. 7 a cross-section of a continuous guide similar to FIG. 6 but using a diaphragm is shown. Tape 112 is supported again by an air bearing provided by air under pressure flowing through the ports 114. The tape 112 is guided against a rigid guide 116 by the continuous strip 118 bonded to the diaphragm 120. Just as in FIG. 6, the strip 118 is only a few mils thick to give it pivotal compliance to the edge profile of the tape. Also, the spring constant of the guide approaches zero since the edge force of the guide is due to a pneumatic pressure being applied to the back of the diaphragm via port 122. Air in the air bearing under the tape 112 can escape out through ports (not shown) in the rigid guide 116 and also into the channel 124 under the compliant guide.

The continuous compliant guides of FIGS. 6 and 7 have a number of advantages. First, because the edge force is due to pneumatic pressure, the spring constant of the continuous compliant guide is very nearly zero, and thus the edge force guiding the tape does not change materially with the edge profile of the tape. For example, this edge force might be $5.00 \pm 0.25$ gm/in of guided length irrespective of width variations in the tape which cause the compliant guide to move. In addition, another advantage of the guide in FIGS. 6 or 7 is that threading of a tape through the guide can be facilitated by applying a vacuum to port 100 or port 122. This causes the compliant guide to retract away from the guided length and permits the tape to move easily through the tape path as it is being threaded.

While the invention has been particularly shown and described with reference to preferred embodiments thereof, it will be understood by those skilled in the art that various changes in form and details may be made therein without departing from the spirit and scope of the invention.

What is claimed is:

1. Apparatus for guiding a web over an arcuate path both immediately before and immediately after a work station to achieve highly accurate guiding of the web past the work station, said apparatus comprising:

a compliant edge guide for guiding the web in the same lateral position along the path irrespective of variations in the width of the web or variations in the dynamic forces on the web;

means for mounting said compliant guide continuously along the arcuate path both before and after the work station;

said compliant guide being both transversely and pivotally compliant with a low spring constant whereby guide forces applied to the web are nearly constant and uniform continuously along the arcuate path both before and after the work station irrespective of deflection of the guide by the web.

2. The apparatus of claim 1 wherein said compliant edge guide comprises:

a spring-loaded guide strip for loading the web with substantially the same lateral force irrespective of perturbations in web width or dynamic forces on the web.

3. The apparatus of claim 1 wherein said compliant edge guide comprises:

a plurality of spring-loaded guides spaced immediately adjacent each other continuously along the arcuate path, each guide pushing against the edge of the web with substantially the same force irrespective of variations in the width of the web or dynamic forces on the web.

4. The apparatus of claim 1 wherein said compliant edge guide comprises:

a pneumatically loaded guide strip for pressing against the edge of the web with substantially the same edge force irrespective of width variations or variations in the dynamic forces on the web.

5. The apparatus of claim 1 and, in addition, means for rigidly guiding one edge of the web so that said compliant guide is only mounted continuously along the other edge of the web and causes the web to be laterally referenced against said rigid edge guiding means.

6. The apparatus of claim 1 and, in addition, means for decoupling the web at either one or both ends of the guided length from large dynamic forces and perturbations in the movement of the web outside the guided length.

7. The apparatus of claim 6 wherein said decoupling means comprises a vacuum column positioned at one or both ends of the guided length.

8. The apparatus of claim 1 and, in addition, means for providing an air bearing along the entire arcuate path both before and after the work station so that the web may be more easily guided by said compliant guide continuously mounted along the guided length.

9. The apparatus of claim 1 wherein said compliant edge guide is mounted by said mounting means on each side of the work station for a distance equal to the web runout.

10. The apparatus of claim 1 wherein said compliant edge guide is mounted by said mounting means on each side of the work station for a distance equal to at least four times the width of the web.

11. Apparatus for continuously compliantly guiding magnetic tape for a predetermined guided length both immediately before and immediately after a read/write station to guide the same point on the tape repeatedly past the same point on the read/write station, said apparatus comprising:

means for radially guiding the magnetic tape over an arcuate path for said predetermined guided length;

means for laterally guiding the magnetic tape with a lateral force continuously distributed along said predetermined guided length, said lateral guiding means being both transversely and pivotally compliant whereby the lateral force on each integral section of the magnetic tape is independent of perturbations in tape width or dynamic forces applied to the tape externally of said predetermined guided length;

said predetermined guided length being long enough to redistribute non-uniform longitudinal stress levels outside the guided length to uniform stress levels in the tape before the tape reaches the read/-write station.

12. The apparatus of claim 11 wherein said means for radially guiding comprises:

an air bearing forming an arcuate path which lies in the same plane for the entire guided length or where the plane of the arcuate path is itself twisted.

13. The apparatus of claim 11 wherein said means for radially guiding comprises:

an air bearing forming a substantially circular arcuate path with two segments, one segment on each side of the read/write station.

14. The apparatus of claim 13 and, in addition:

means for decoupling the tape at one or both ends of the guided length with a vacuum column so that some of the external dynamic forces normally acting on the magnetic tape are decoupled from the magnetic tape in the guided length.

15. The apparatus of claim 11 wherein said lateral guiding means comprises:

a rigid edge guide along said predetermined guided length at one edge of the magnetic tape;

a transversely and pivotally compliant edge guide positioned continuously along said predetermined guided length at the other edge of the magnetic tape whereby the magnetic tape is laterally guided continuously and compliantly relative to the fixed edge guide.

16. The apparatus of claim 15 wherein said compliant edge guide comprises a plurality of spring-loaded edge guides immediately adjacent each other with each spring-loaded guide providing an edge force against the edge of the tape which is substantially independent of tape runout or dynamic forces on the tape.

17. The apparatus of claim 15 wherein said compliant edge guide comprises:

a continuous compliant guide strip of flexible material having a spring constant in the order of a gram per mil of deflection per inch of guided length, and said strip has a thickness of a few mils.

18. The apparatus of claim 15 wherein said compliant edge guide comprises:

a continuous strip of flexible material bonded to the surface of an elastic bag or diaphragm, said bag or diaphragm being pressurized by a constant pressure source so that the effective spring constant of the guide strip is substantially zero.

19. Web guiding apparatus for guiding thin webs past a critical web control area comprising:

guiding means for continuously edge guiding the web for a long guided length including the critical web control area;

means for supporting the web in an arcuate path during the long guided length;

said guiding means being compliant in two dimensions of motion, one dimension being transverse to the direction of motion of the web, and the other dimension being rotational about an axis normal to the surface of the web whereby said guiding means provides an edge force uniformly distributed along the guided length and said edge force is substantially invariant despite width and edge profile variations in the web.

20. The apparatus of claim 19 wherein said arcuate path is a helical path and said critical web control area is the circular path of a rotating magnetic head near the midpoint of the helical path.

21. The apparatus of claim 19 wherein said guiding means comprises:

a spring-loaded guide strip whose thickness is less than one-one thousandth of the cyclic variations in the edge profile of the web, the spring constant of said guide strip being less than a gram per mil of deflection per inch of guided length.

22. The apparatus of claim 19 wherein said guiding means comprises:

a thin pivotal compliant strip sufficiently compliant to conform to the edge profile of the web;

an elastic member pneumatically biased for carrying said compliant strip, the pneumatic bias providing the uniformly distributed edge force invariant despite width variations in the web.

23. The apparatus of claim 19 wherein said guiding means comprises:

a plurality of spring-loaded guides mounted adjacent to each other along the entire guided length;

each of said guides being compliant relative to the width of the web and the edge profile of the web so that edge force on the web will be uniformly distributed and there will be no stress concentration in the web caused by edge force.

* * * * *